United States Patent [19]

Rassatt

[11] Patent Number: 5,458,008
[45] Date of Patent: Oct. 17, 1995

[54] CONDENSATION AND EVAPORATION SYSTEM FOR AIR DATA SENSOR SYSTEM

[75] Inventor: Bradley B. Rassatt, Bloomington, Minn.

[73] Assignee: The B.F. Goodrich Company, Akron, Ohio

[21] Appl. No.: 165,735

[22] Filed: Dec. 10, 1993

[51] Int. Cl.$^6$ .................................................... G01L 1/00
[52] U.S. Cl. ................................... 73/861.68; 73/861.65
[58] Field of Search ...................... 73/861.68, 861.65, 73/182; 165/2

[56] References Cited

U.S. PATENT DOCUMENTS

| | | | |
|---|---|---|---|
| 2,306,684 | 12/1942 | Carbonara | 73/861.68 |
| 2,482,701 | 9/1949 | Anderson | 73/861.68 |
| 2,706,408 | 4/1955 | Holbrook | 73/861.68 |
| 3,267,992 | 8/1966 | Werner et al. | 165/2 |
| 4,645,517 | 2/1987 | Hagen et al. | 55/182 |
| 5,062,869 | 11/1991 | Hagen | 55/159 |

OTHER PUBLICATIONS

"An Integrated Probe/Sensor Design for Future Distributed Air Data System Applications" by Donald F. Mulkins and Garrett Controls, 1988 IEEE, pp. 309–317.

*Primary Examiner*—Richard E. Chilcot, Jr.
*Assistant Examiner*—R. Biegel
*Attorney, Agent, or Firm*—Westman, Champlin & Kelly

[57] ABSTRACT

An air data system includes a probe body defining a probe passageway which has a probe inlet and a probe outlet. The probe passageway is heated and couples an air pressure from the probe inlet to the probe outlet. A sensor has a sensor inlet for receiving the air pressure. The sensor provides a sensor output indicative of the air pressure. A coupling body has a coupling passageway which couples the air pressure from the probe outlet to the sensor inlet. The coupling passageway has a cooled surface for condensing moisture from air in the coupling passageway. The coupling body has a reservoir positioned relative to the cooled surface to collect the condensed moisture. The reservoir is heated to evaporate the condensed moisture.

19 Claims, 4 Drawing Sheets

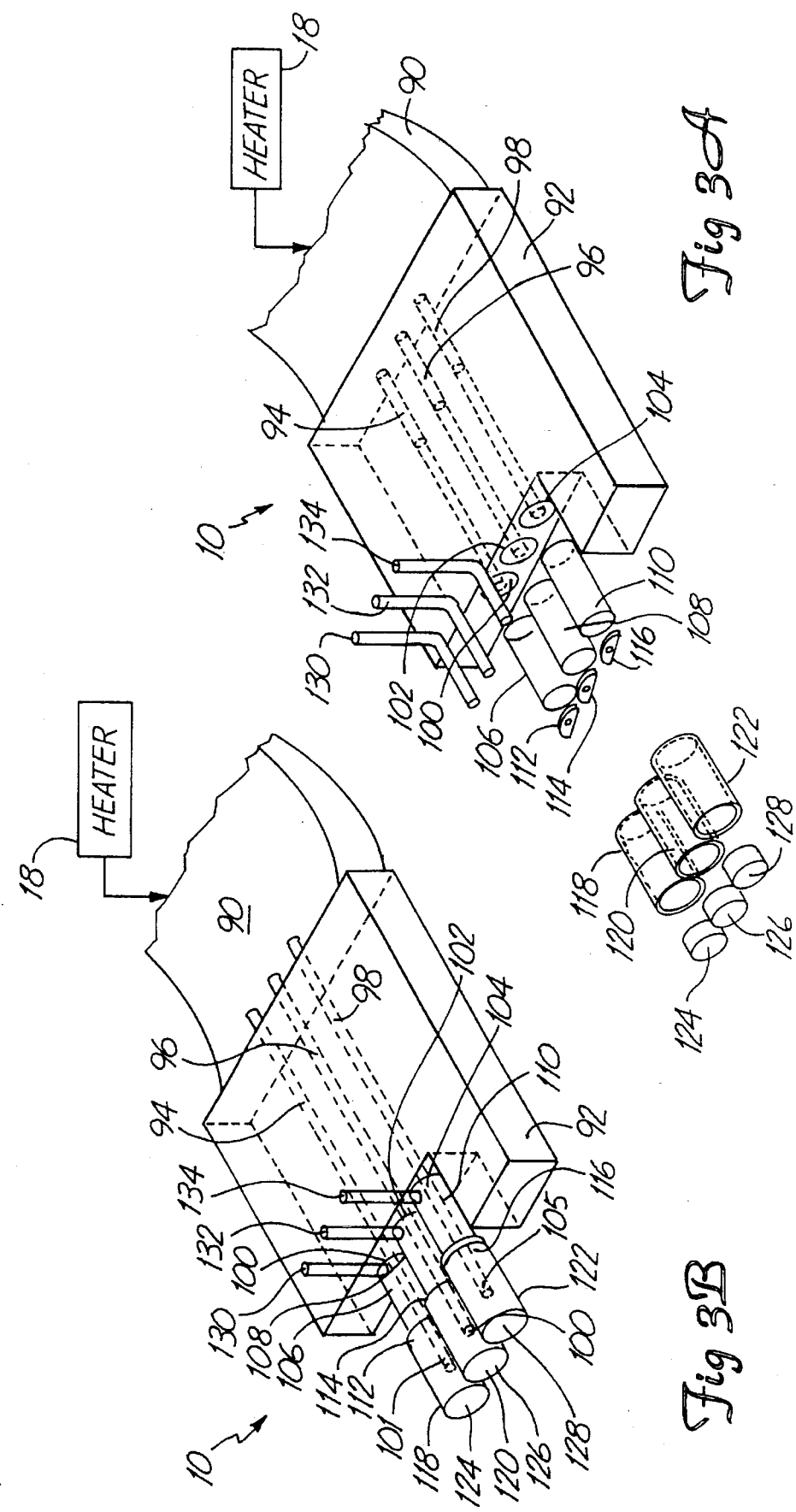

5,458,008

CONDENSATION AND EVAPORATION SYSTEM FOR AIR DATA SENSOR SYSTEM

BACKGROUND OF THE INVENTION

The present invention relates to an air data system. More particularly, the present invention relates to a system for preventing and removing moisture ingested (from both condensation and liquid ingestion) into an air data sensor system which is used on, for example, air vehicles and weather monitoring sites.

Air data sensing probes are typically embodied in sensing systems such as Pitot tubes, Pitot-static tubes, flush static ports, and multi-functional probes. The sensing probes typically measure static flow angle or Pitot pressure. The sensors provide a pneumatic input, such as air pressure, to a transducer which converts the pneumatic input to an electrical output indicative of the pneumatic input. Such probes are typically electrically heated for de-icing and anti-icing.

During ground or flight operations, the aircraft, and consequently the probe, is subjected to conditions such as rain, sleet, snow, ice, high pressure washing sprays, temperature and humidity extremes. During such operations, moisture can be ingested into the probe. Thus, moisture ingestion has been a long standing problem with such probes.

Further, during the ascent of an aircraft, an air pressure differential is created between the interior of the probe and the exterior air mass. The air pressure is higher inside the probe until the pressure bleeds off and equalizes with the exterior air mass. The opposite is true during descents. The air pressure inside the probe is lower than the external air mass until equilibrium occurs. The volume and rate of this "bleeding" in the system is a function of the total air volume of the system, and the rate of climb or descent of the aircraft. Once moisture is ingested into the system, the bleeding can force the moisture well into the pneumatic passageways in the system. If cold temperatures are then encountered, the moisture freezes thereby blocking the pneumatic passageways causing erroneous air data readings.

Another problem with moisture ingestion has also been observed. During ground operations, the probe is typically powered up and heated to remove any accumulated moisture. Warm air can carry a high amount of water vapor into the probe. Heating of the air in the probe increases the water carrying capacity of the air and may force water vapor upstream and downstream in the pneumatic lines. Furthermore, meniscuses formed in the relatively small diameter pneumatic tubes may be undesirably forced downstream toward the transducer. Water vapor carried into the system typically condenses at the cool points of the probe (i.e., at temperatures below the dew point temperature of the water vapor). If the probe is exposed to cold enough temperatures, the condensed water can freeze thereby blocking the pneumatic tubes in the probe, again causing erroneous pressure readings.

Prior systems for dealing with moisture which is ingested into air data probes included moisture traps or bottles. While such traps or bottles reflect important advances in the art, maintenance is required during ground operations to open or empty the traps or bottles to eliminate water from the system. Thus, there is a continuing need for systems which eliminate moisture, in the form of water, ice or vapor, from air data probes and which require no maintenance during ground operations.

SUMMARY OF THE INVENTION

The present invention includes an air data system having a probe body which defines a probe passageway having an inlet and an outlet. The probe passageway couples an air pressure from the probe inlet to the probe outlet. A coupling member defines a sealed coupling passageway for receiving the air pressure from the outlet of the probe. A sensor has a sensor inlet which receives the air pressure from the coupling passageway and provides a sensor output signal representative of the air pressure. The coupling member includes a structural portion which is thermally isolated from the reminder of the coupling member and which defines a part of the coupling passageway. The structural portion is cooled relative to the outlet of the probe and relative to the sensor and the sensor inlet to condense moisture from air in the coupling passageway.

In a preferred embodiment, the present invention also includes a heated reservoir for collecting the condensed moisture. Thus, the closed system of the present invention can perform as a relative cold point condenser and as an evaporator requiring substantially no manual intervention to eliminate moisture therefrom.

BRIEF DESCRIPTION OF THE DRAWINGS

FIGS. 3A, 3B and 3C are illustrations of the present invention in an L-shaped probe.

DETAILED DESCRIPTION OF THE PREFERRED EMBODIMENTS

Figure 1A:
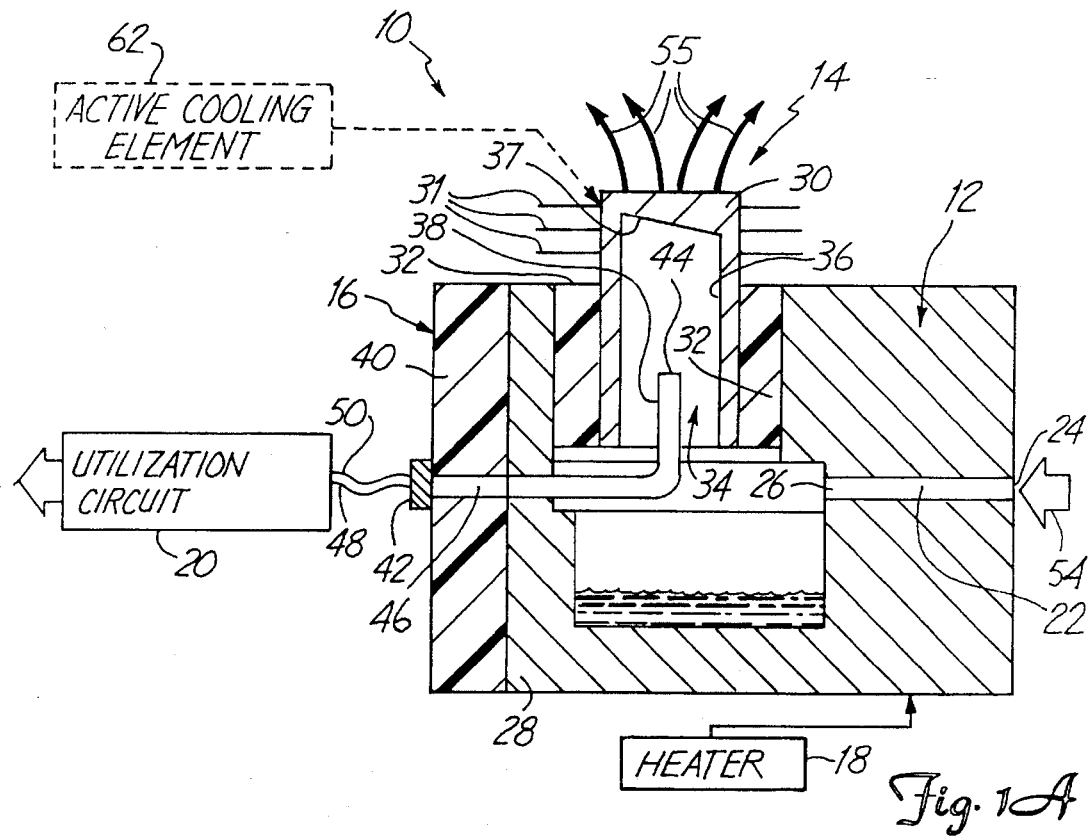
FIG. 1A is a cross-sectional view of an air data system according to the present invention shown in partial block diagram form and illustrating condensation.

FIG. 1A is a cross-sectional view of air data system 10 showing portions of the system in block diagram form. Air data system 10 is generally representative of a Pitot tube, a Pitot-static tube, a flush static port or a multi-functional probe.

Air data system 10 includes probe 12, coupling portion 14, and sensor assembly 16. In the embodiment shown in FIG. 1A, a heater 18 is also coupled to probe 12. In addition, a utilization circuit 20 is coupled to sensor assembly 16 for providing an output signal.

Probe 12 includes a probe passageway 22 which has a probe inlet 24 and a probe outlet 26. In one preferred embodiment, probe 12 is arranged on an aircraft so that it receives an air pressure to be sensed at inlet 24 and provides that air pressure to probe outlet 26.

Coupling portion 14 includes a thermally conductive reservoir 28, a thermally conductive cold point cap 30, and a thermally non-conductive support 32 which supports cold point cap 30 in coupling portion 14. By thermally non-conductive, it is meant that the material has a low thermal conductivity relative to probe 12, plastic being an example. By thermally conductive, it is meant that the material has a relatively high thermal conductivity, such as aluminum. Coupling portion 14 can be a separate member, but is preferably integral with probe 12. Coupling portion 14 defines a coupling passageway 34 which receives the air pressure to be sensed from probe outlet 26 and couples it, along an inner surface 36 of cold point cap 30, to a pneumatic sensor input line 38.

Sensor assembly 16 includes a sensor body 40 and a transducer 42. Sensor body 40 is coupled to pneumatic sensor input line 38. Pneumatic sensor input line 38 is in thermal contact with reservoir 28 and receives the air pressure to be sensed at a sensor input 44. Line 38 couples the pressure to a sensor passageway 46 defined by sensor body 40, which in turn couples the air pressure to transducer 42.

Transducer 42 converts the air pressure sensed into an electrical signal representative of the sensed air pressure and provides the electrical signal via conductors 48 and 50 to utilization circuit 20. Utilization circuit 20, in turn, receives and processes the electrical signal provided by transducer 42 and provides a desired output signal based on the signal received.

Sensor body 40 is preferably thermally non-conductive to avoid coupling an undesirably large amount of heat toward transducer 42 and its associated circuitry. Such heat can damage the transducer 42 and circuitry. However, line 38 is thermally conductive and is coupled to reservoir 28, and the circuitry associated with transducer 42 also generates heat. Thus, passageway 46 is kept well above freezing and above the temperature of the air in passageway 34 along surface 36. Typically, the air in passageway 46 is at a temperature of approximately 145° Fahrenheit or at a temperature which is preferably at least 20 degrees Fahrenheit higher than surface 36 of cold cap 30. This temperature differential can be adjusted by varying the dimension of the thermally conductive and non-conductive portions in system 10.

Air data system 10 operates in two phases which can occur separately or simultaneously. Air data system 10 condenses moisture from the air in the system, and also evaporates or purges moisture from the system. FIG. 1A illustrates air data system 10 in operation during its condensing phase. The desired air pressure is coupled in the direction indicated by arrow 54, into the probe inlet 24 of probe 12. At times, air movement also occurs in this direction. The air pressure is coupled into the coupling passageway 34 and up along the inner surface 36 of cold point cap 30. Cold point cap 30 thermally couples to the ambient atmosphere outside of data system 10 and thus acts as a heat sink conducting heat from system 10 to the external atmosphere. This is shown by arrows 55.

Heater 18 applies heat to the thermally conductive portions of probe 12. Through direct application, or through thermal conduction, the heat is applied to thermally conductive reservoir 28. Reservoir 28 thus maintains an elevated temperature. However, since cold point cap 30 is thermally isolated from reservoir 28 by thermally non-conductive member 32, the heat from heater 18 is not transferred to cold point cap 30 through thermal conduction from reservoir 28.

Since cold point cap 30 thermally couples to the external ambient air, the inner surface 36 of cold point cap 30 is a cold point relative to the rest of air data system 10, including the probe 12, reservoir 28 and sensor assembly 16 (and consequently the air in the air passageways 22, 34 and 46). It is widely recognized that condensation in a system such as air data system 10 tends to occur at the cold point in the system. Therefore, as air and water vapor pass along inner surface 36 of cold point cap 30, the water vapor condenses and is collected in reservoir 28.

FIG. 1A shows that the upper portion 37 of inner surface 36, proximate inlet 44, is oriented at an angle with respect to surface 44 to cause condensed moisture which forms as liquid on the surface 37 to run down the surface 36 into reservoir 28. Preferably surfaces 36 and 37 are coated with a substance, such as Teflon, having a high surface energy to repel water and discourage formation of droplets. This substantially eliminates condensed moisture from falling into line 38. Alternatively, the entire system 10, or any part of the system can be oriented to achieve this effect without requiring the upper portion of surface 36 to be formed at an angle.

While FIG. 1A is not to scale, in the preferred embodiment, the volume of the interior of cap 30 is roughly equal to the volume of reservoir 28 and passageway 34. Also, opening 44 is preferably located in the center of the interior of cap 30. Therefore, if the aircraft maneuvers so that system 10 is inverted, and the water collects in cap 30, the volume of cap 30 is large enough so that the water level does not reach opening 44. This substantially eliminates ingestion of water into line 38.

Pneumatic line 38 is also formed of a thermally conductive material. Thus, all of the thin pneumatic tubes, in which a meniscus could form from ingested moisture, receive heat from heater 18 or the circuitry associated with transducer 42, or from the relatively warm air or fluid present in passageways 22, 34 and 46. The tubes thus maintain a temperature higher than the inner surface 36 of cold point cap 30. Water vapor condenses from the air or fluid along the inner surface 36 of cold point cap 30 and does not condense in any of the other pneumatic passageways.

Figure 1B:
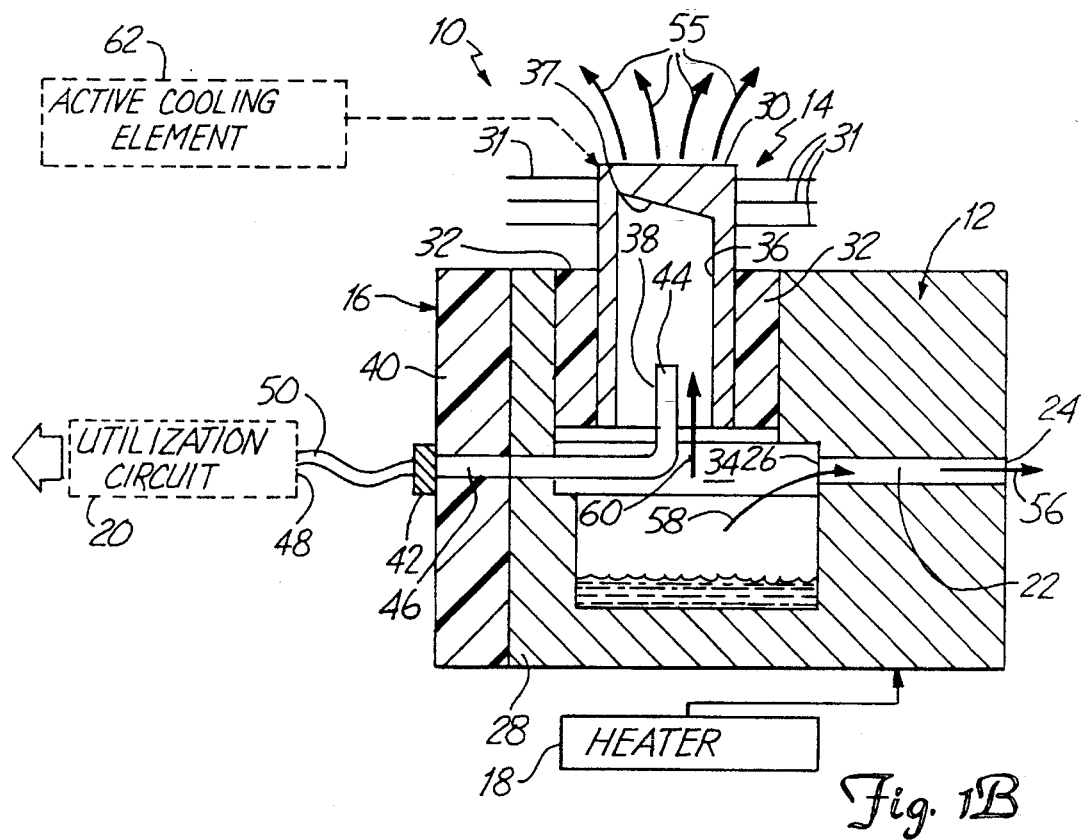
FIG. 1B is a cross-sectional view of the air data system of FIG. 1A illustrating evaporation.

Typically, during all operations, air data system 10 operates in its evaporating or purging phase. This is illustrated in FIG. 1B. This phase, as described below, actually occurs any time the ingestion rate of moisture is lower than the purging or evaporation rate, but typically occurs most frequently and efficiently during power up and during other ground operations.

Heater 18 continues to supply heat to probe 12. This increases the temperature of reservoir 28 which, in turn, heats the line 38, the gasses and fluids in reservoir 28 and in passageways 22 and 34. As the gasses are heated, they expand. Since system 10 is a closed system (i.e., the system is sealed except for the opening at probe inlet 24), back pressure develops at the transducer end of the system so that as the gasses expand, they must expand toward outlet 24. This forces any fluid which has formed a meniscus in tube 22 out through inlet 24, as indicated by arrow 56.

Heat is continuously supplied by heater 18 until reservoir 28 reaches a temperature which is high enough to boil or evaporate accumulated condensed moisture located in the reservoir 28. Again, since system 10 is a closed system, water vapor from the evaporated moisture tends to migrate out of the system through inlet 24. Also, at all times during operation, but particularly during the evaporation phase, the entire air data system 10 is above the temperature in the atmosphere outside of air data system 10. Thus, the air external to air data system 10 is the ultimate relative cold point of the entire system. This also causes vapor to migrate to the external atmosphere. This is indicated by arrow 58.

Any water vapor that does migrate upwardly in the direction indicated by arrow 60, and not out of inlet 24, encounters the relative cold point formed by inner surface 36 of cold point cap 30, recondenses on inner surface 36, and is again collected in reservoir 28 and evaporated. Once the system is purged, very little moisture remains in system 10. Thus, during flight, there is typically very little liquid in reservoir 28.

In a preferred embodiment, passageway 34 and the cavity in reservoir 28 are both of sufficient dimension that no meniscus can be formed by water ingested into the system. Since no meniscus can form, the moisture stored in reservoir 28 is unaffected by changes in pressure which can occur, for example, during ascents and descents of the aircraft. Also, in the preferred embodiment, passageway 22 opens at its outlet 26 directly into reservoir 28 so that any meniscus formed by moisture ingested in passageway 22 breaks and the moisture falls into reservoir 28 upon reaching outlet 26. Thus, if the moisture ingestion rate exceeds the evaporation rate, reservoir 28 acts as a buffer to hold the moisture until it can be evaporated from the system.

As shown in FIGS. 1A and 1B, cold point cap 30 is preferably formed as having a number of heat fins 31 of aluminum or other suitable thermally conductive material. As the moisture is condensed along inner surface 36, it generates heat. Therefore, irrespective of other heat effects, in order to maintain a relative cold point, cold point cap 30 should be capable of dissipating on the order of three to five Watts of energy during the condensation phase. For example, a typical condensation rate for a system is 0.019 g/min. Assuming a fin surface temperature of $T_{fin}=125°$ Fahrenheit, and an ambient temperature of $T_{amb}=75°$ Fahrenheit, the heat load required to condense 0.019 g/min can be determined from the relation:

$$q=mh_{fg} \qquad \text{Eq. 1}$$

where m= the mass to be condensed per minute; and $h_{fg}=$ the enthalpy factor calculated at the saturation temperature (212° F.).

Therefore, $$q=0.019 * 2257/60=0.715W \text{ (2.44 Btu/hr)}. \qquad \text{Eq. 2}$$

The required surface area to dissipate this heat load can be calculated using Newton's law of cooling as follows:

$$q=hA_{req}(T_{fin}-T_{amb}) \qquad \text{Eq. 3}$$

where $A_{req}$ is the required surface area and h is a convection coefficient (assumed to be 1). Solving for $A_{req}$ yields:

$$A_{req}=0.049 \text{ ft}^2=7.0 \text{ in}^2. \qquad \text{Eq. 4}$$

Assuming the surface area of each fin has an inner diameter of 0.5 inches and an outer diameter of 1.0 inches, the area per fin is:

$$A_{fin}= 2*3.14159/4*(1^2-0.5^2)=1.18 \text{ in}^2 \qquad \text{Eq. 5}$$

Therefore, the number of fins needed to meet the required surface area is:

$$A_{req}/A_{fin}=7.0/1.18=6 \qquad \text{Eq. 5}$$

A spacing between fins of 0.075 inches has been observed to work appropriately.

This heat fin arrangement provides increased heat dissipation capability over a simple conductive cap.

In another preferred embodiment, cold point cap 30 is simply formed as an aluminum cap and is coupled to a thermally conductive structural portion of the aircraft. This arrangement also increases heat dissipation. However, caution must be taken not to cool the inner surface 36 of cold point cap 30 so it is as cool as the ambient atmosphere or so that it is at or below freezing. Maintaining surface 36 at a temperature of approximately 125° Fahrenheit is preferred.

It should also be noted that cold point cap 30 could be supported in any number of ways. For example, an O-ring arrangement (not shown) could be used in which cap 30 is supported in coupling portion 14 by an O-ring and an air gap is left between cap 30 and probe 12.

Additionally, the volume of the entire system should preferably be minimized. The amount of moisture to be condensed is proportional to the volume from which it is to be condensed. Close coupled systems which minimize air volume to on the order of 0.5 cubic inches are preferred because there is less moisture to be condensed and evaporated than in systems which include, for example, hundreds of feet of pneumatic tubing. Such large volume systems may have a volume of 200 cubic inches or more yielding a condensate mass approximately 400 times greater than a close coupled system. Minimizing the volume helps reduce weight, power requirements and requisite heat dissipation properties of system 10.

Passageway 22 is preferably formed of a conventional S-trap design having a relatively small diameter. Such a design is well known and is shown in U.S. Pat. No. 5,062,869 which is hereby incorporated by reference. This design typically minimizes ingestion of liquid and particulate matter into passageway 34. The small diameter tubes in the S-trap design keep any meniscus intact which assists in expulsion of such liquid and particulate matter through expansion of the gasses in the system during power up of the system. Since the moisture is expelled by the expanding gasses, it does not need to be evaporated and the system power up purge time is decreased.

While FIGS. 1A and 1B show a surface 36 in the coupling passageway 34 being cooled by having cold point cap thermally coupled to the ambient atmosphere, the same cooling effect could be accomplished in a number of different ways. For example, the passive cooling offered by cap 30 can be replaced or augmented by an active cooling element 62 shown in phantom in FIGS. 1A and 1B. Such an active cooling element can be accomplished through use of a pneumatic ejector for inducing or biasing flow across the cold cap 30. Further, a thermoelectric cooler, such as a Peltier device or other active cooling apparatus, can also be located relative to the coupling passageway 34 to provide the desired relative cold point.

Figure 2:
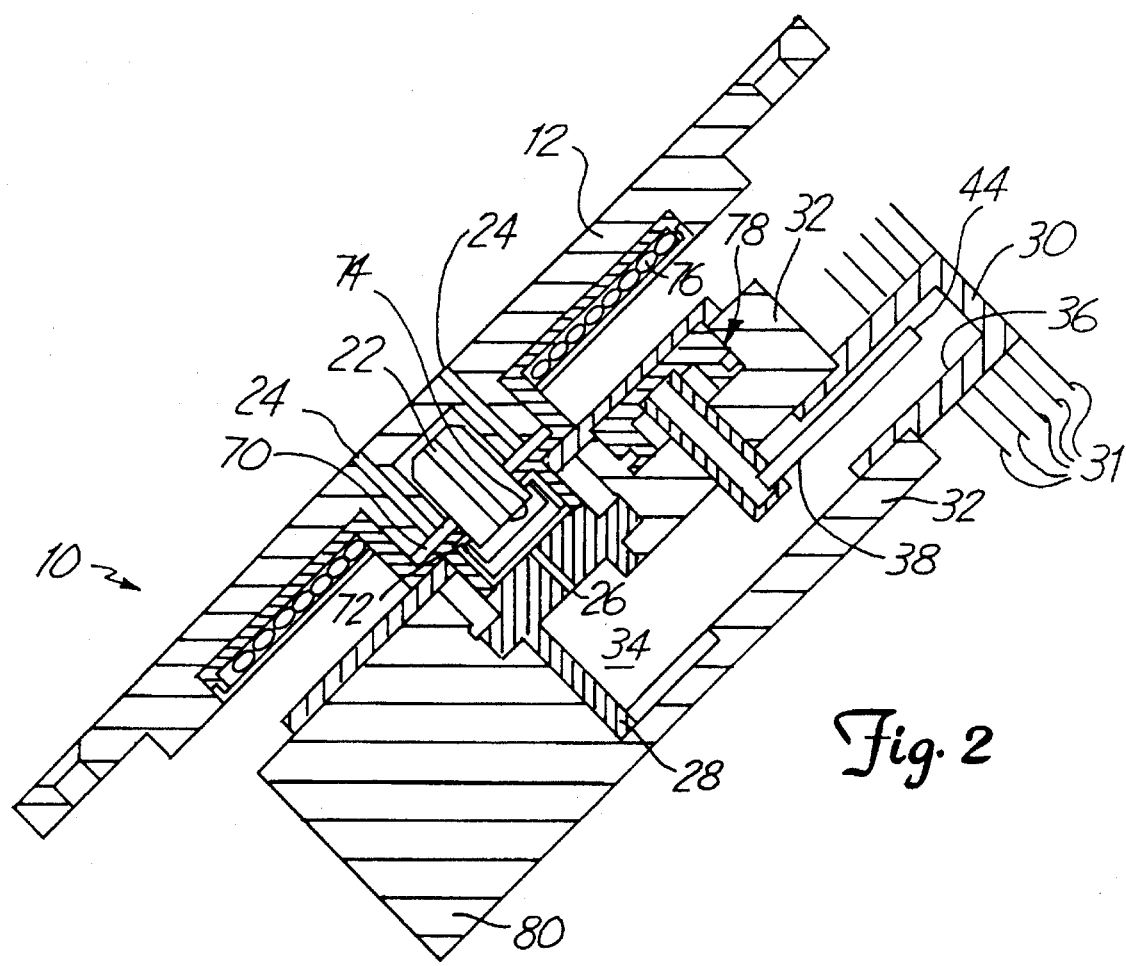
FIG. 2 is a cross-sectional view of the present invention embodied in a flush static port.

FIG. 2 shows a preferred embodiment of an air data system 10 implemented in a flush static port used on aircraft. Similar features of air data system 10 are similarly numbered to those shown in FIGS. 1A and 1B.

Air data system 10 shown in FIG. 2 includes a flush static port 12 which has a plurality of inlets 24 for receiving the air pressure. Passageway 22 is of the S-trap design, when viewed from inlet 24 to outlet 74, which includes a number of drain traps 70 and 72 used to trap ingested moisture and particulate matter so it does not reach the transducer. Heater 18 is provided in the form of an annular heating ring 76 attached to a power supply (not shown) for heating air data system 10. Heating ring 76 is in thermal contact with portions of probe 12, and with reservoir 28. In addition, heating ring 76 is also in thermal contact with pneumatic tube 38 via thermal coupling assembly 78. Manifold 80, formed of a thermally non-conductive material such as plastic, is used to support thermally conductive cold point cap 30 within air data system 10.

In the embodiment shown in FIG. 2, air data system 10 is oriented so that as air passes into thermally conductive cold point cap 30, it condenses and drains into reservoir 28. FIG. 2 also shows that cold point cap 30 is thermally isolated from annular heating ring 76 by non-conductive portions 32 of manifold 80.

Also, FIG. 2 shows that reservoir 28 and passageway 34 are of sufficient diameter that a meniscus does not form from condensed moisture. Thus, when the temperature of reservoir 28 is raised to a point sufficient to boil or evaporate fluid, the air inside the passageways of air data system 10 expands and fluid is not forced toward the transducer 42. Rather, any meniscuses which form are located in passageway 22, and expansion of air in the system forces the water out of the probe inlets 24 to the external atmosphere.

Figure 3C:
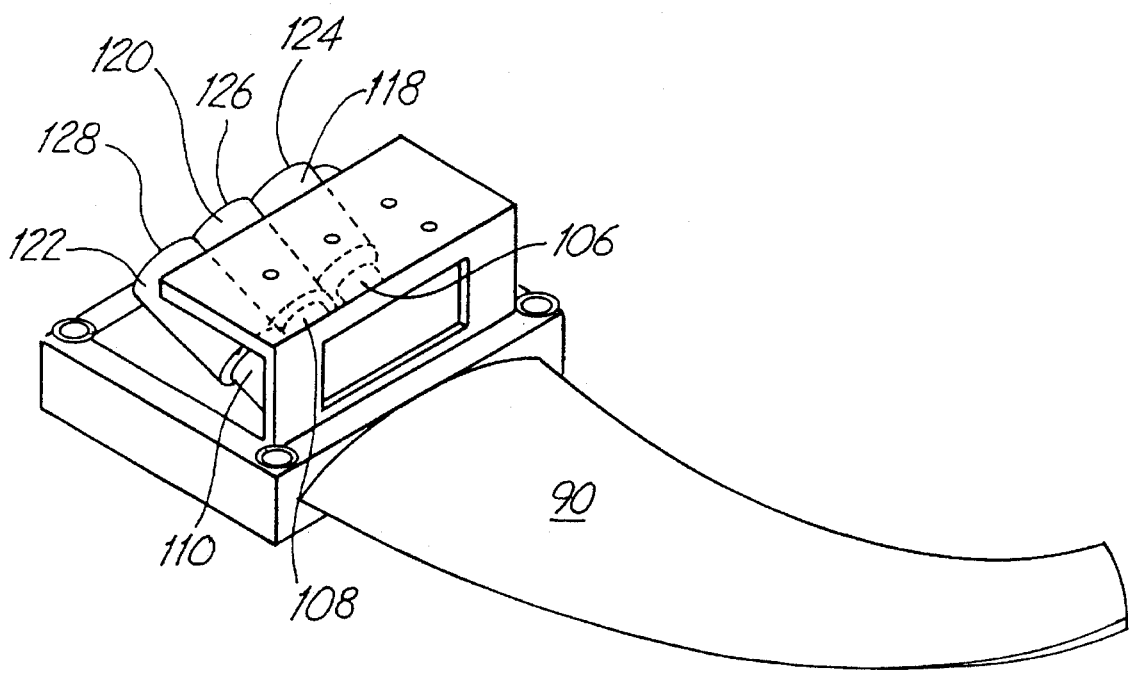

FIGS. 3A, 3B and 3C show another embodiment of the present invention. FIG. 3A is an exploded view of an L-shaped probe 90 coupled to a base plate 92. Base plate 92 is shown extended to have exaggerated length for the sake of clarity but is preferrably close coupled to allow increased thermal conduction across its length. Pneumatic tubes 94, 96 and 98, shown in phantom in FIG. 3A, extend from a distal end of probe 90 (not shown) into and through base plate 92. Tubes 94, 96 and 98 extend to tubing exit ends 100, 102 and 104, respectively. Thermally conductive sleeves 106, 108 and 110, couple the air pressure from ends 100, 102, and 104 and terminate with bulkheads 112, 114 and 116.

Thermally conductive sleeves 106, 108 and 110 extend into thermally non-conductive sleeves 118, 120 and 122, which are capped by thermally conductive end caps 124, 126 and 128. End caps 124,126 and 128 are, in turn, thermally coupled to either an air mass which is cooler than the internal air of air data system 10, or to a structure which is coupled to a cooler air mass.

Additional pneumatic tubes 130,132 and 134 are each inserted into one of thermally conductive sleeves 106, 108 and 110. Tubes 130, 132 and 134, have first ends 101, 103 and 105 which extend proximate caps 124, 126 and 128 and have second ends which extend into a transducer housing (not shown).

FIG. 3B shows the system 10 of FIG. 3A assembled. In operation, air pressure is coupled through pneumatic tubes 94, 96 and 98 from probe 90 to the output ends 100, 102 and 104 of the pneumatic tubes. At the output ends, the air is coupled through non-conductive sleeves 118, 120 and 122 past thermally conductive caps 124, 126 and 128. Since caps 124, 126 and 128 are thermally isolated from the remainder of the thermally conductive portions of the system by thermally non-conductive sleeves 118,120 and 122, caps 124,126 and 128 act as a relative cold point in the air data system 10. Thus, moisture condenses in the thermally non-conductive sleeve portions 118, 120 and 122. The air pressure is then coupled back through tubes 130, 132 and 134 to the transducer housing.

FIG. 3C shows a side elevational view of the system shown in FIGS. 3A and 3B. In FIG. 3C, the orientation of the thermally conductive sleeves 106, 108 and 110, as well as the thermally non-conductive sleeves 118, 120 and 122 and the cold caps 124, 126 and 128, is shown. FIG. 3C clearly shows that, during the normal orientation of the system, any water which condenses at the relative cold point of caps 124, 126 and 128 drains toward the thermally non-conductive sleeves, back into conductive sleeves 106, 108 and 110. As the water is stored in this reservoir, the temperature of the conductive sleeves 106, 108 and 110 is raised through thermal conduction to evaporate or boil the water back out of the system.

Although the present invention has been described with reference to preferred embodiments, workers skilled in the art will recognize that changes may be made in form and detail without departing from the spirit and scope of the invention.

What is claimed is:

1. An air data system, comprising:

a probe body defining a probe passageway having a probe inlet and a probe outlet, the probe passageway being heated and coupling an air pressure from the probe inlet to the probe outlet;

a sensor having a sensor inlet for receiving the air pressure, the sensor providing a sensor output indicative of the air pressure; and a coupling body having a coupling passageway coupling the air pressure from the probe outlet to the sensor inlet, the coupling passageway having a cooled surface for condensing moisture from air in the coupling passageway, and the coupling body having a reservoir positioned relative to the cooled surface to collect the condensed moisture, the reservoir being heatable to evaporate the condensed moisture, the cooled surface being a cold point relative to the probe body, the sensor, and the reservoir, regardless of whether the reservoir is heated to evaporate the condensed moisture, and the cooled surface being at a temperature above ambient air external to the air data system.

2. The air data system of claim 1 wherein the probe body and the coupling body are formed integrally with one another.

3. The air data system of claim 1 wherein the coupling passageway is dimensioned large enough to inhibit formation of a meniscus in the coupling passageway by moisture in the system.

4. The air data system of claim 1 wherein the cooled surface of the coupling body comprises:

a thermally conductive first member in thermal contact with a body of air having a temperature lower than a temperature of air in the sensor inlet, the first member having a thermal conductivity; and an insulating member supporting the first member proximate the coupling passageway, the insulating member having a low thermal conductivity relative to the thermal conductivity of the first member.

5. The air data system of claim 4 wherein the thermally conductive first portion comprises:

an air fin.

6. The air data system of claim 1 wherein the sensor comprises:

a sensor body defining a sensor passageway coupled to the sensor inlet to receive the air pressure, the sensor inlet being a heated tube.

7. The air data system of claim 1 wherein the cooled surface comprises:

a thermally conductive portion defining a portion of the coupling passageway; and an active cooling element coupled to the thermally conductive portion.

8. An air data system, comprising:

a probe having an inlet and an outlet, the probe coupling air pressure from ambien air proximate the inlet to the outlet along a sealed passageway sealed other than at the inlet and the outlet;

a sensor, coupled to the probe, having a sensor inlet for receiving the air pressure coupled by the probe and for providing a sensor output signal representative of the air pressure; and wherein the probe includes a cooled structural portion being cooled relative to a remainder of the sealed passageway, and relative to the sensor and the sensor inlet to condense moisture from air in the sealed passageway, the cooled structural portion being at a temperature above the ambient air, and being spaced from the sensor, and wherein the sealed passageway comprises:

a reservoir positioned relative to the cooled structural portion of the probe to collect the condensed moisture; and a heater, coupled to the reservoir to heat the reservoir to evaporate the collected condensed moisture, the cooled structural portion remaining a cold point relative to the sensor and a remainder of the probe while the heater heats the reservoir.

9. The air data system of claim 8 wherein the sealed passageway comprises:

a reservoir positioned relative to the cooled structural portion of the probe to collect the condensed moisture; and a heater, coupled to the reservoir to heat the reservoir to evaporate the collected condensed moisture, the cooled structural portion remaining a cold point relative to the sensor and a remainder of the probe other than the cooled structural surface while the heater heats the reservoir.

10. The air data system of claim 8 wherein the cooled structural portion of the probe comprises:

a thermally conductive member in thermal communication with the ambient air and having a thermal conductivity; and thermally insulating material supporting the thermally conductive member relative to the reservoir, and having a thermal conductivity lower than the thermal conductivity of the thermally conductive member.

11. The air data system of claim 10 wherein the outlet of the probe and the sensor inlet are defined by thermally conductive material heated by the heater.

12. The air data system of claim 8 wherein the sealed passageway between the inlet and the cooled structural surface is dimensioned small enough so that ingested liquid tends to form a meniscus therein.

13. The air data system of claim 8 wherein the probe is an L-shaped probe.

14. The air data system of claim 8 and further comprising:

an active cooling element coupled to the cooled structural surface for cooling the cooled structural surface.

15. An air data system, comprising:

a probe body having a probe inlet and a probe outlet and a heated probe passageway coupling an air pressure sensed at the probe inlet to the probe outlet;

a sensor having a sealed sensor passageway, sealed between an inlet thereof and an outlet thereof, therein for receiving the sensed air pressure and providing an output indicative of the pressure;

a coupling body having a coupling passageway therein coupling the air pressure from the probe outlet to the sensor passageway, the coupling passageway including a cooled surface which is cooled for accumulating moisture from the air in the coupling passageway, the cooled surface being cooler than the probe passageway and the sensor and warmer than ambient air external to the probe inlet; and wherein the coupling body has a reservoir spaced from the cooled surface and positioned relative to the cooled surface to collect moisture accumulated by the cooled surface, the reservoir including a heater for heating the reservoir to evaporate collected moisture.

16. The air data system of claim 15 wherein the probe body and the coupling body are integral with one another.

17. The air data system of claim 15 wherein the sensor passageway is heated.

18. The air data system of claim 17 wherein the coupling body further comprises a support formed of a thermally non-conductive material supporting the cooled surface and having a thermal conductivity lower than that of the coupling body.

19. The air data system of claim 15 wherein the sealing of the sensor and coupling passageways blocks air flow through the sensor and coupling passageways.

* * * * *